United States Patent

[11] 3,623,020

[72] Inventor Roger Alain Mao
Somerville, N.J.

[21] Appl. No. 883,181
[22] Filed Dec. 8, 1969
[45] Patented Nov. 23, 1971
[73] Assignee RCA Corporation

[54] FIRST-IN FIRST-OUT BUFFER REGISTER
13 Claims, 6 Drawing Figs.

[52] U.S. Cl. .......... 340/172.5
[51] Int. Cl. .......... G06f 5/06
[50] Field of Search .......... 340/172.5

[56] References Cited

UNITED STATES PATENTS

| | | | |
|---|---|---|---|
| 2,951,233 | 8/1960 | Tanco et al. | 340/172.5 |
| 2,957,163 | 10/1960 | Kodis | 340/172.5 |
| 3,051,929 | 8/1962 | Smith | 340/172.5 |
| 3,135,947 | 6/1964 | Grondin et al. | 340/172.5 |
| 3,208,050 | 9/1965 | Bird et al. | 340/172.5 |
| 3,274,559 | 9/1966 | Giroux et al. | 340/172.5 |
| 3,374,467 | 3/1968 | Cast et al. | 340/172.5 |
| 3,434,117 | 3/1969 | Gibson et al. | 340/172.5 |
| 3,497,627 | 2/1970 | Blasbalg et al. | 340/172.5 |

*Primary Examiner*—Raulfe B. Zache
*Assistant Examiner*—Jan E. Rhoads
*Attorney*—H. Christoffersen

ABSTRACT: A storage means receives, and stores in separate stages, the bits of serially transmitted digital data. The stored data is read out during the read-in period at a rate which may be equal to or slower than that of the input data and which may start at the time the first bit is received. Output gates coupled to the storage means stages are enabled, one at a time, to read out the stored bits in the same order in which they are received.

INVENTOR
Roger A. Mao
BY
ATTORNEY

INVENTOR
Roger A. Mao
BY
H. Christoffersen
ATTORNEY

INVENTOR
Roger A. Mao
BY H. Christoffersen
ATTORNEY

INVENTOR
Roger A. Mao
BY

ATTORNEY

INVENTOR
Roger A. Mao
BY
H. Christofferson
ATTORNEY

FIRST-IN FIRST-OUT BUFFER REGISTER

BACKGROUND OF THE INVENTION

The invention herein described was conceived in the course of a contract with the Department of the Army.

It is known in the art to use shift registers to receive and store data which may be propagated at some arbitrary rate. A problem arises, however, when the shift register has to interface between a first source of input data which sends out a large number of data bits at an extremely high-bit rate and a computer or other user which has to operate on or use the input data but can only do so at a slower rate. The problem of reading-out the data at a rate different from the read-in rate is even more severe when it is desired to start the readout of the data concurrently with the receipt of the first bit or at any time during the read-in of the input data.

Using presently known serial shift registers, it is necessary to wait until the register is filled before getting a serial output. Even in those shift registers with parallel outputs, there is normally at least one clock time delay between the incoming pulses and the output pulse, and furthermore, if a serial output is desired, the parallel outputs would have to be arranged to provide the desired serialization of the data and the output rate would have to be equal to the input rate.

It is therefore an object of this invention to provide a circuit which accepts serial digital data having a first rate and makes the data available during the read-in period as a serial digital data output having a second rate which may be equal to or less than the first rate.

SUMMARY OF THE INVENTION

A buffer register for receiving serially propagated input data having a first rate and making the data immediately available in serial form at a second rate. The buffer register includes storage means for storing in separate stages the bits of serially transmitted data and output gates coupled to the stages of said storage means, said output gates being enabled one at a time, for reading-out the stored bits immediately or at some later time at said second rate and in the same order in which they are received.

BRIEF DESCRIPTION OF THE DRAWINGS

In the accompanying drawings like reference characters denote like components, and.

DETAILED DESCRIPTION OF THE INVENTION

Figure 1:
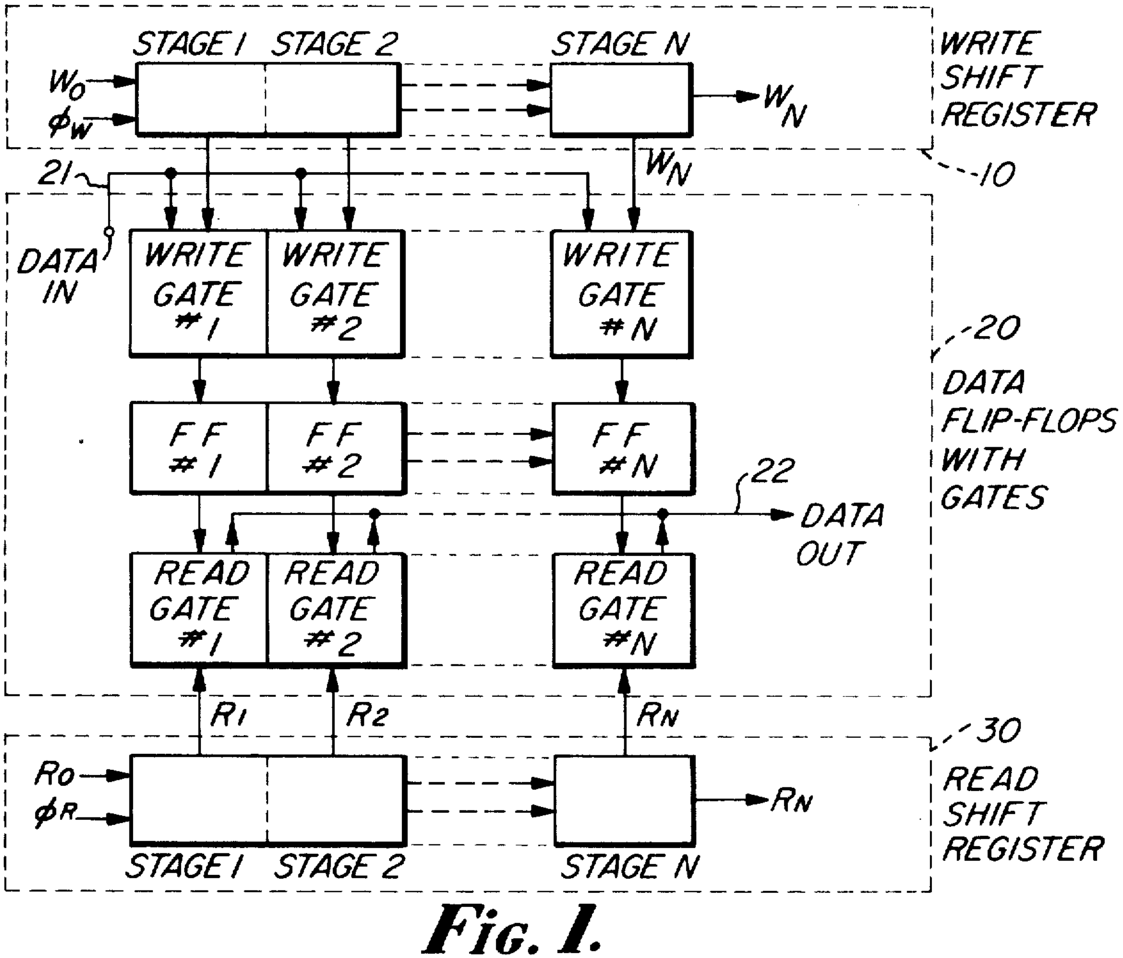
FIG. 1 is a block diagram of a buffer register embodying the invention.

FIG. 1 depicts in block diagram form a buffer register adapted to receive serially propagated pulses carried on the input line (DATA IN) 21 and for reading-out the pulses in the order received on the output line (DATA OUT) 22. The buffer register includes three sections: (1) a write shift register 10 operated at the same rate and in synchronism with the input data to energize the appropriate write gates and flip-flops for the orderly receipt and storage of the incoming pulses; (2) data flip-flops with write and read gates shown in dashed box 20 for storing, in the order received, the input data pulses; and (3) a read shift register 30 operated at a rate which may be independent of the input data rate to control the initiation of the output flow of data and its rate from the flip-flops onto the output line.

The write shift register contained in box 10 has a number of stages $n$ equal to the maximum number of input pulses to be stored. Corresponding to each write shift register stage, there is a write gate, a flip-flop, a read gate and a read shift register stage. The write register has a write clock input $\phi_W$ whose pulses may be derived or triggered from the source generating the data input bits or other means responsive to the presence of the input bits to ensure synchronism with the data input bits. The frequency of the write clock determines the rate at which an initiate or marker input pulse $W_0$, applied to coincide with the first data input pulse, is propagated along the register. Each stage of the write register has an output line ($W_1$, $W_2$, ... $W_n$) coupled to one of the write gates contained in box 20. A single pulse appears along the output lines of the write register in the order from $l$ to $n$ of the stages with only one output energized at any one time. This arrangement ensures that the write gates will be sequentially energized and that only one of the write gates will be energized at any one time.

Corresponding to each shift register stage in box 10, there is a corresponding write gate connected between the input line 21 and the flip-flop associated with that stage. The input data line 21 is coupled to all of the write gates and when a write gate is energized by a write pulse, it provides a low-impedance conduction path between the input line and its associated flip-flop. This enables the transfer of a data pulse from the input line to the flip-flop and since the data pulses are serially propagated and the write gates are serially energized, the pulses will be stored in the flip-flops in the order received from stage $l$ through $n$.

It should be made clear that for correspondence to occur, the marker or initiate pulse $W_0$ must be applied to the write register at the beginning of the stream of input data pulses and the $\phi_W$ rate must be synchronous with the data rate. There will then be correspondence between the pulses on the input data line, the energizing of the write gates, and the storing of the data in the flip-flops. Explicitly, when the first input pulse comes in, the $W_1$ pulse energizes write gate 1, which then provides a low-impedance conduction path enabling the first input data pulse to set flip-flop 1. The remaining write gates are not energized and do not provide a low-impedance conduction path. When the second input data pulse appears on line 21, there is a corresponding shift of the "clocking" pulse from $W_1$ to $W_2$ which energizes write gate 2. The second data pulse is thus coupled into and sets flip-flop 2 while all the other write gates are open and provide no conduction path. In this same manner, each input pulse and the information contained therein will in turn be coupled and stored in a different one of the flip-flops.

The information stored in the flip-flops may be read out as it is being stored or at any time thereafter and the readout rate may be any arbitrarily selected rate. Flexible readout is achieved by means of the read shift register shown in box 30 and the associated read gates shown in box 30 connected between its corresponding flip-flop and the data output line 22.

The read register, like the write shift register, may be any known type of register. Its operating characteristics should, however, be similar to those of the write shift register. That is, upon the application of an initiate or marker pulse $R_0$, a clock pulse $\phi_R$ causes a single pulse to sequentially advance, at a rate determined by $\phi_R$ along the shift register output lines denoted by $R_1$, $R_2$, ...$R_n$, so that a single read gate is energized at any one time.

A read gate when energized by a pulse from the read register provides a low-impedance conduction path between line 22 and the flip-flop to which the gate $n$ connected. Thus, when a read gate is energized, the data contained in the flip-flop associated with it is fed onto the output line 22 for a period of time equal to the period ($1/f$) of $\phi_R$.

The marker pulse $R_0$, which initiates the readout cycle, may be applied at any arbitrary instant of time. Furthermore, the clock $\phi_R$ may have a frequency ranging from zero cycles per second up to the frequency of the write clock ($\phi_W$). This feature enables the readout to be immediate is so desired and to be of any desired repetition rate. Practically, the frequency of the clock $\phi_R$ will be determined by the rate at which the user of the data can absorb or use the stored information.

Figure 2:
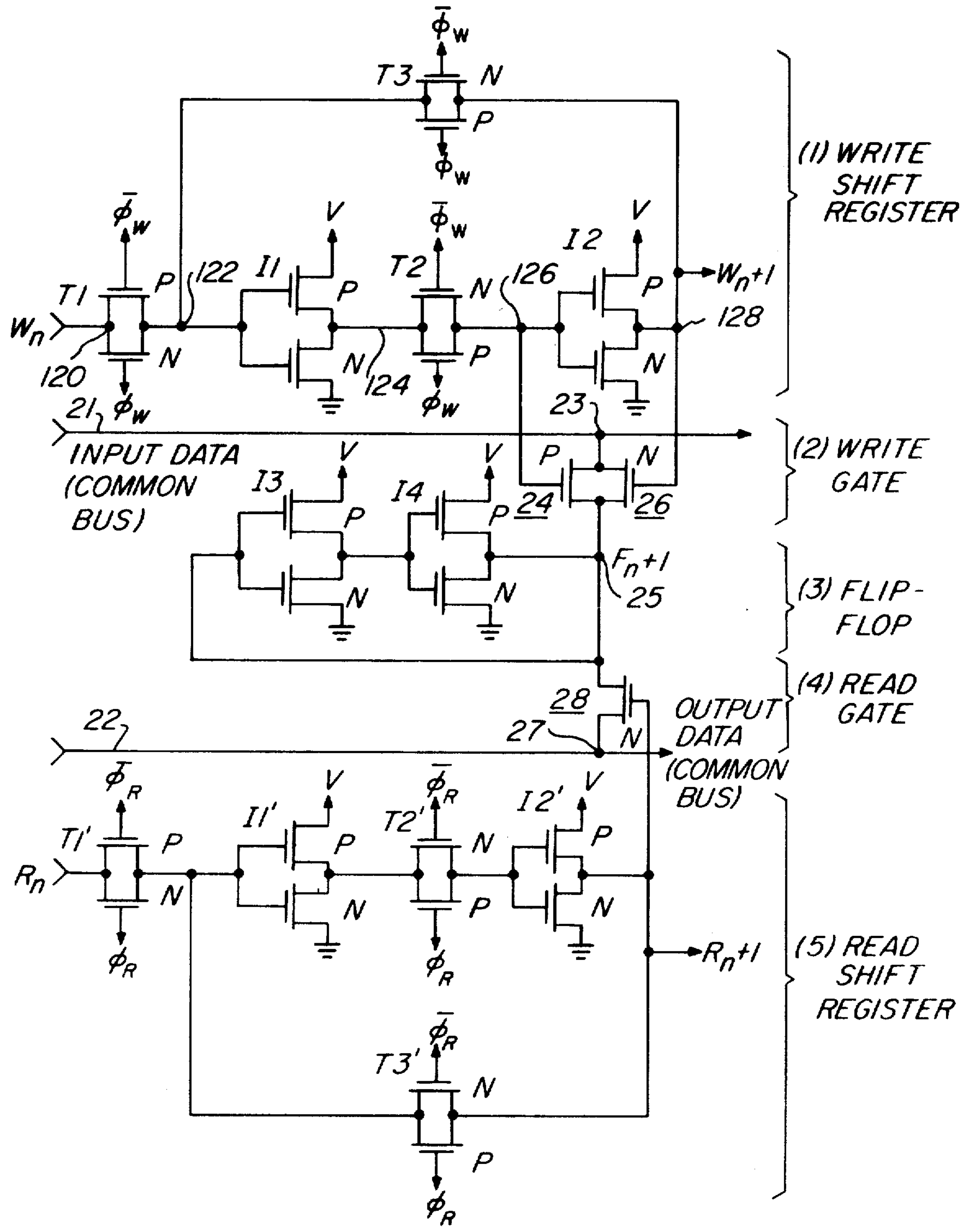
FIG. 2 is a schematic diagram of the circuitry used in one stage of a buffer register embodying the invention.

Any one of a number of different types of registers, gates and flip-flops may be employed to realize the system of FIG. 1. However, for purposes of illustration, a preferred implementation of one stage of the system is shown in FIG. 2. Only metal-oxide semiconductor (MOS) devices are employed, mostly in complementary parts, for the shift registers, the gates, and the flip-flops. The advantages of such a design is simplicity of fabrication and low-power consumption.

The write and read registers, from the fabrication viewpoint, are preferably identical in structure, however, it is not essential that this be so. The registers shown are well known in the art and need not be described in great detail. Suffice it to say that each stage includes three complementary transmission gates identified at T1, T2, and T3 and two complementary inverters identified as I1 and I2. The P-type and N-type devices are indicated, respectively, by the letters P and N, marked next to the appropriate device. The P-type devices are turned on when the potential applied to their gate electrode is "low" and the N-type devices are turned on when the potential applied to their gate electrode is "high".

The clock pulse $\phi_W$ is applied to the gate of one transistor of the transmission gate and the complement of the clock pulse $\bar{\phi}_W$ is applied to the gate of the other transistor of the transmission gate. This ensures that either both devices of the transmission gate are concurrently turned on and thus the transmission gate is turned on and behaves like a closed switch or that both devices are concurrently cutoff and the transmission gate is turned off and behaves like an open switch. Also, when $\phi_W$ is high ($\bar{\phi}_W$ is low) transmission gate T1 is closed and transmission gates T2 and T3 are open. Conversely, when $\phi_W$ is low ($\bar{\phi}_W$ is high) T1 is open and T2 and T3 are closed.

The operation of the register will now be illustrated using the write register. Assume that an initiate pulse $W_n$ having a "high" level is applied to T1 at junction point 120 and that the clock $\phi_W$ is also "high". Transmission gate T1 is closed (i.e., it provides a low-impedance conduction path) and transmission gates T2 and T3 are open (i.e., they are cutoff and present an extremely high impedance). The "high" level of $W_n$ is thus coupled to junction point 122 which is the input point of inverter I1. As a result, a "low" level is generated at the output of I1 (junction point 124). However, since T2 is open, no other signal levels are changed until $\phi_W$ changes phase. Note that the input impedance of MOS devices is extremely high and that charge accumulated at junction point 122 due to the "high" input level of $W_n$ will be stored on the gates of the devices constituting inverter I1.

When the clock $\phi_W$ goes from high to low, transmission gates T2 and T3 are closed and T1 is opened. The closure of T2 and T3 turns the combination of I1, I2, T2 and T3 into a cross-coupled bistable multivibrator. The signal at junction point 124, which is the inverse of the input signal, is coupled through T2 to junction point 126 which is the input of the second inverter I2. I2 inverts the signal so that its output at junction point 128 is in-phase with the initiating signal at junction point 122, and since T3 is closed, the signal is "positively" fed back thereby locking the information into the flip-flop. That is, until the next clock pulse is applied, the signal at junction point 128 is "high" and the signal at junction point 126 is "low". Note that junction point 128 is also labeled $W_{n+1}$ to indicate that the pulse $W_n$ appears at the output 128, one clock pulse after it was first applied at the input junction point 120. It is thus seen that a single pulse may be sequentially propagated down the line of the shift register.

The write gate which includes P-type device 24 and N-type device 26 is similar in structure and operation to the transmission gates used in the shift register. The transfer gate of the P-device is connected to junction point 126 and the gate of the N-device is connected to junction point 128. The conduction path of the write gate (the source-drain path of transistors 24 and 26) is connected between junction point 23 on input data line 21 and junction point 25 which is the input-output (I/O) point of the flip-flop.

The bistable multivibrator includes two complementary inverters denoted I3 and I4 which are cross-coupled to form a static flip-flop.

When the level at junction point 126 is "low" and the level at junction point 128 is "high", the write gate is highly conductive and provides a low-impedance conduction path between the input line 21 and I/O point 25. The input data pulse then present on the input line will be forced into the flip-flop and set it to the state represented by the input pulse. By way of example, if the data pulse is "high", it will be inverted by inverter I3 and fed to inverter I4 which will in turn invert the signal and positively feed it back to the input of I3 thereby setting the flip-flop to the level of the input signal. The flip-flop being of the static variety will maintain the information stored in it indefinitely.

The information stored in the flip-flop may be read out by means of the read gate shown as a single N-type device having its conduction path connected between the I/O point 25 of the flip-flop and junction point 27 on output data line 22. The read gate may instead be a complementary transmission gate, but is is found, in practice, that a single transistor gate used in conjunction with a current sensing scheme operates satisfactorily and reliably in this particular circuit.

The read gate is controlled by the output denoted $R_{n+1}$ of the read shift register. The read register is identical in structure to the write register (the same reference numerals primed are employed) and is operated in an identical manner. The clock pulse $\phi_R$ applied to the read register may be completely independent of $\phi_W$ and the $R_n$ need not be related to $W_n$. When a "high" level is generated at $R_{n+1}$ transistor 28 is turned on and the information stored in the flip-flop may be nondestructively transferred onto the output line 22. Note that the read gate may be energized while the data is being read into the flip-flop or at any other time.

Figure 3:
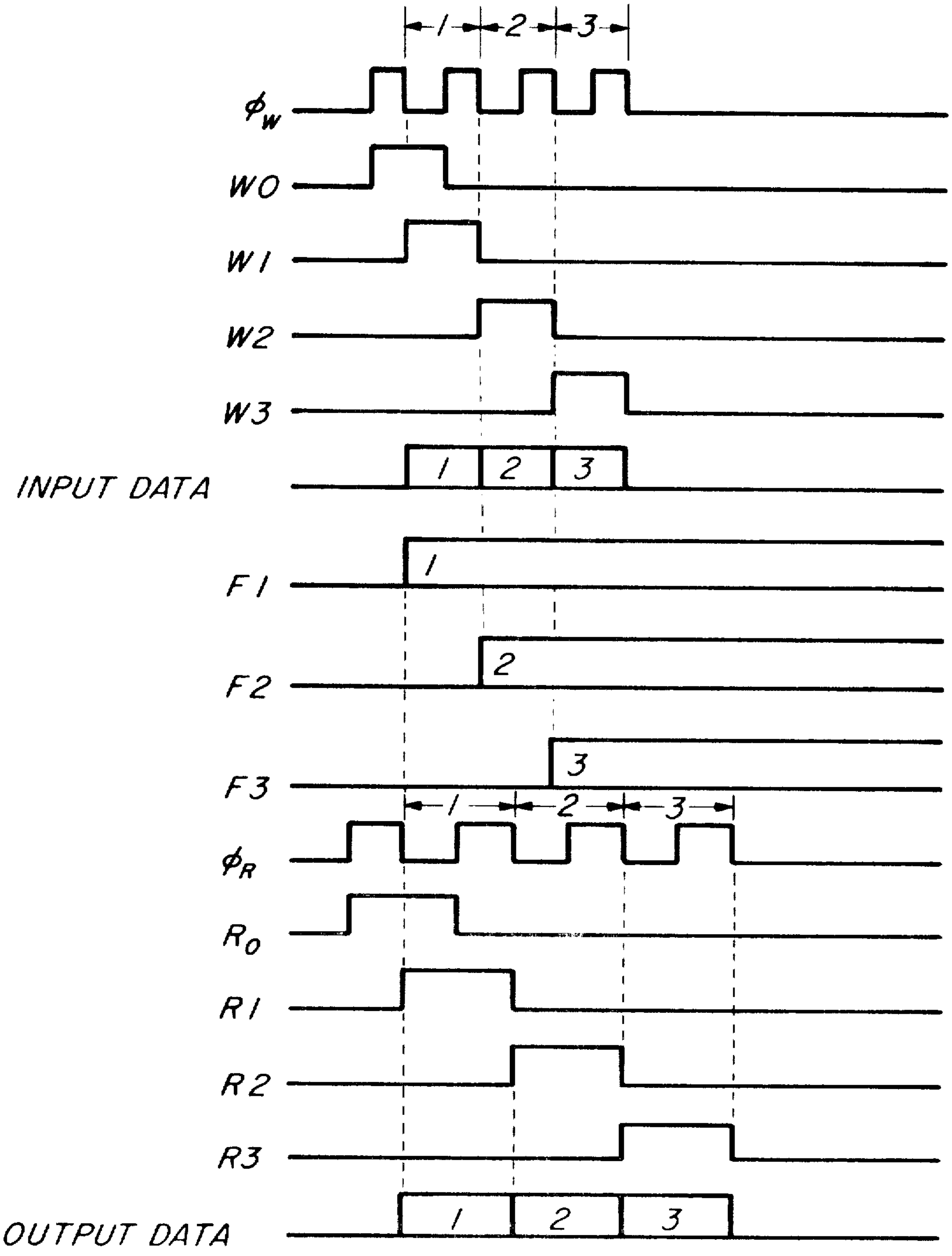
FIG. 3 is a typical timing diagram of input, output and clock pulses used and generated in the operation of the buffer register of FIG. 1 using the circuitry of FIG. 2.

To further understand the invention, a typical timing diagram is shown in FIG. 3 showing the read-in and readout process for three input data pulses applied to the system of FIG. 1 using the circuitry of FIG. 2. The marker pulse $W_0$ is applied slightly ahead of the input data to ensure that when $\phi_W$ goes low the $W_1$ pulse occurs to correspond with the first pulse (1) of the input data. With the concurrence of the (1) input data pulse and $W_1$ flip-flop 1 (F1) will be set to the level of the first (1) data input pulse and will remain in that state until a new cycle and a new $W_1$ pulse is generated. The second clock pulse causes the clocking or scanning pulse to advance to $W_2$ which causes the second flip-flop (F2) to store the second (2) input data pulse. The third clock pulse causes a further advance of the scanning pulse causing the third flip-flop (F3) to store the third (3) data pulse.

FIG. 3 helps to illustrate how the input data may be read out immediately but at a different rate. Applying a marker or initiate pulse $R_0$ to coincide with the beginning of the reception of data but using a clock pulse $\phi_R$ having a different (lower) frequency than $\phi_W$ the output data appears immediately but at the rate determined by $\phi_R$. The scanning or clocking pulse advances through the read shift register at a different (slower) rate than the incoming data. This causes each read gate to be energized for a different (longer) period of time than the corresponding write gate which results in output pulses of different (longer) duration than the input data pulses.

It has thus been shown that by means of the embodiment shown in FIG. 1 and as realized in FIG. 2, information stored in the stages of the storage means may be removed either immediately or at some later time independently of input clock rate. The data bits may be removed at output clock rates either equal to or less than the input clock rate. The read-in and readout of the data bits may be synchronous or asynchronous with respect to each other. The data bits may even be removed at output clock rates greater than the input clock rate provided that the information is already stored in the storage means. The static register shown in FIG. 2 permits the data bits to be read out nondestructively in addition to providing static storage.

It should also be evident that the shift registers shown in FIG. 1 and illustrated in FIG. 2 and used to generate sequentially spaced pulses could be replaced by any other distributor or distributing system such as a counter and decoder combination which can also provide pulses in an orderly fashion and on parallel output lines as is done by the shift registers.

It should also be appreciated that there may be more than one data input line on which pulses are generated by the source of input data. In such case, it should be evident that a number of blocks equivalent to block 20 shown in FIG. 1 could be operated in parallel by the write and read shift registers.

Figure 4:
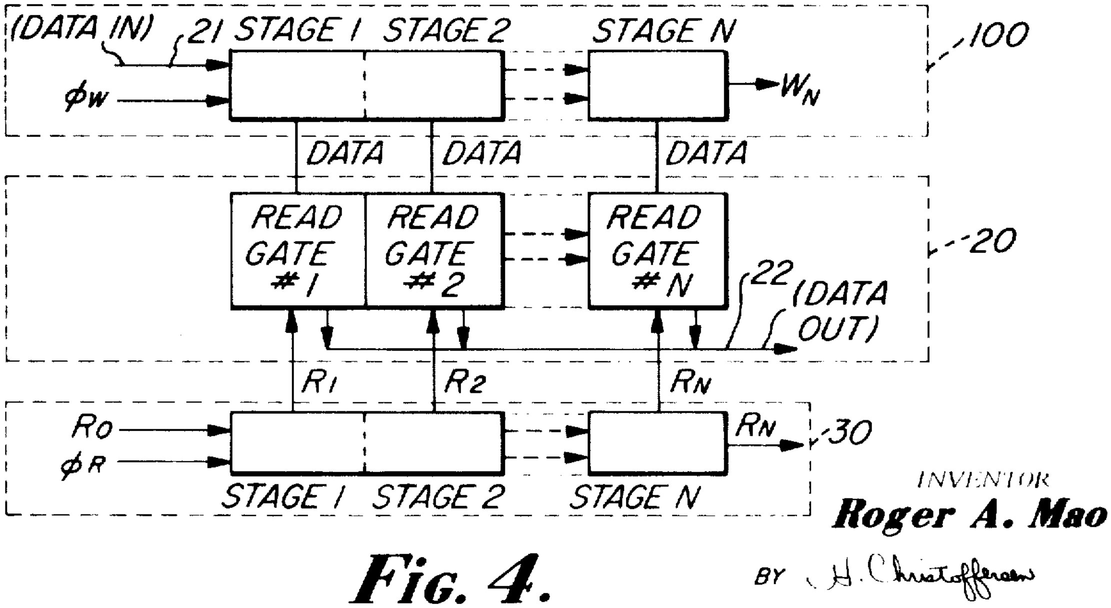
FIG. 4 is a block diagram of another buffer register embodying the invention.

FIG. 4 is a block diagram of another embodiment of the invention. In this embodiment, a write shift register 100 is used to perform the functions of clocking in the data and of storing the incoming pulses. The information is read out of the write shift register by means of the read shift register 30 in conjunction with the read gates contained in block 20. The write gates and the flip-flops used in FIG. 10 have been eliminated. The high degree of flexibility permitted by the system of FIG. 1 is not present in the system of FIG. 2, also, the simple readout process available in the system of FIG. 1 must be replaced by a more complex scanning scheme in order to readout the pulses at a rate different than the incoming one.

The write shift register as well as the read shift register contain up to n stages to correspond to the maximum number $n$ of data input pulses to be stored in the register. Corresponding to each stage there is present a read gate connected between the write register and the data output line 22. The data input pulses received on data input line 21 are clocked into and down the write shift register by means of the write clock pulses $\phi_W$ which are synchronized to the input pulses and are at the same rate. The data bits fed into the write register will be clocked in and will travel down the write register at a rate determined by $\phi_W$ Readout as was the case for the system of FIG. 1, may occur at any arbitrarily selected period of time, but the readout rate, thought it may be widely varied, must now be some submultiple of the read-in rate. This is discussed shortly in connection with FIG. 6.

Figure 5:
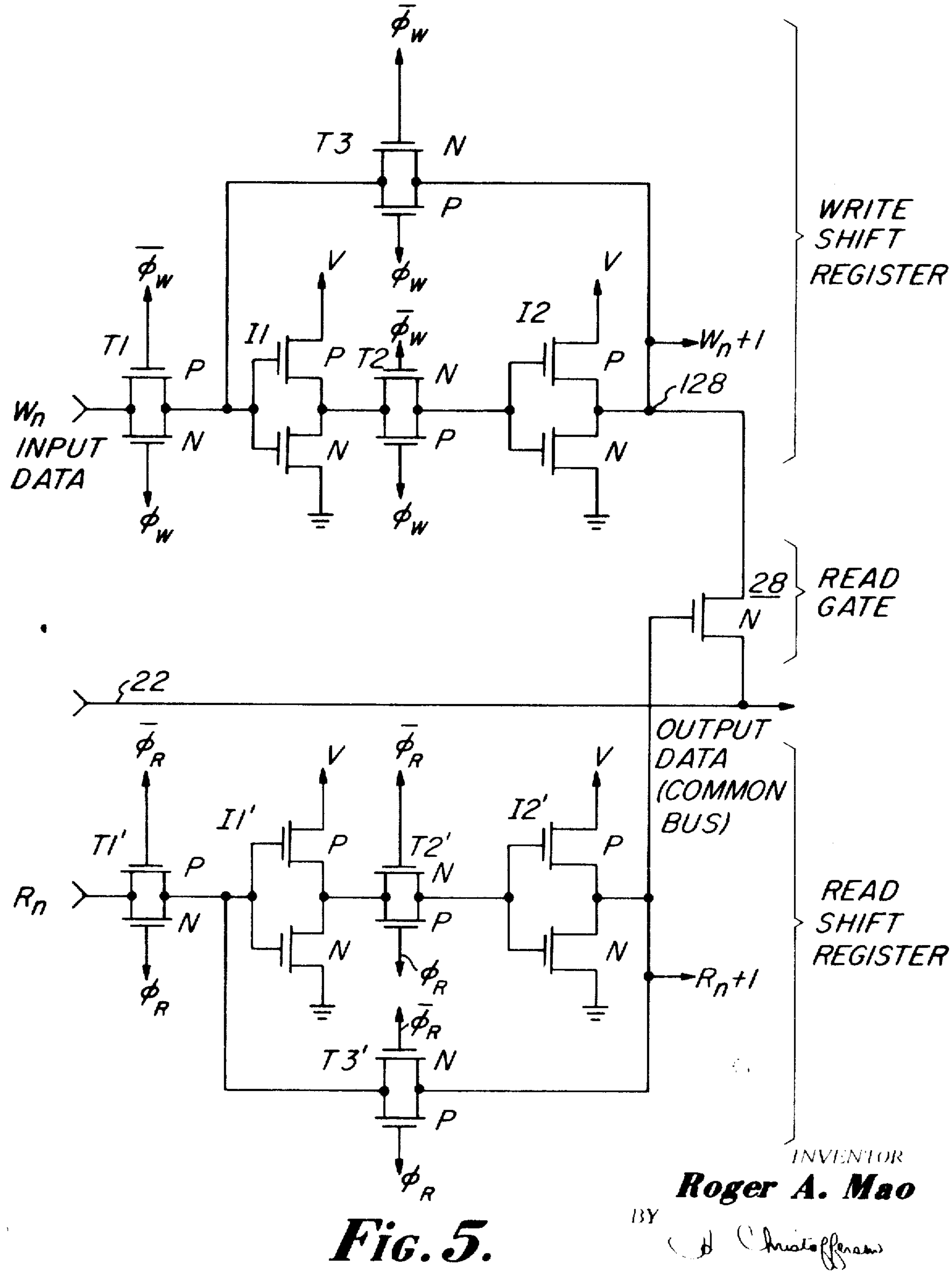
FIG. 5 is a schematic diagram of one stage of the embodiment shown in FIG. 4.

The circuitry for realizing the system of FIG. 4 is shown in FIG. 5. The two shift registers shown in FIG. 5 are identical to the write and read shift registers of FIG. 2 and need not be described again. Note that the read gate, identical to the one of FIG. 2, includes a single N-type transistor having its conduction path connected between the output point 128 of inverter 2 of the write shift register and data output line 22. The gate electrode of transistor 28 is connected to the output of inverter 2 of the read shift register which thereby controls the conductivity of the read gate.

Figure 6:
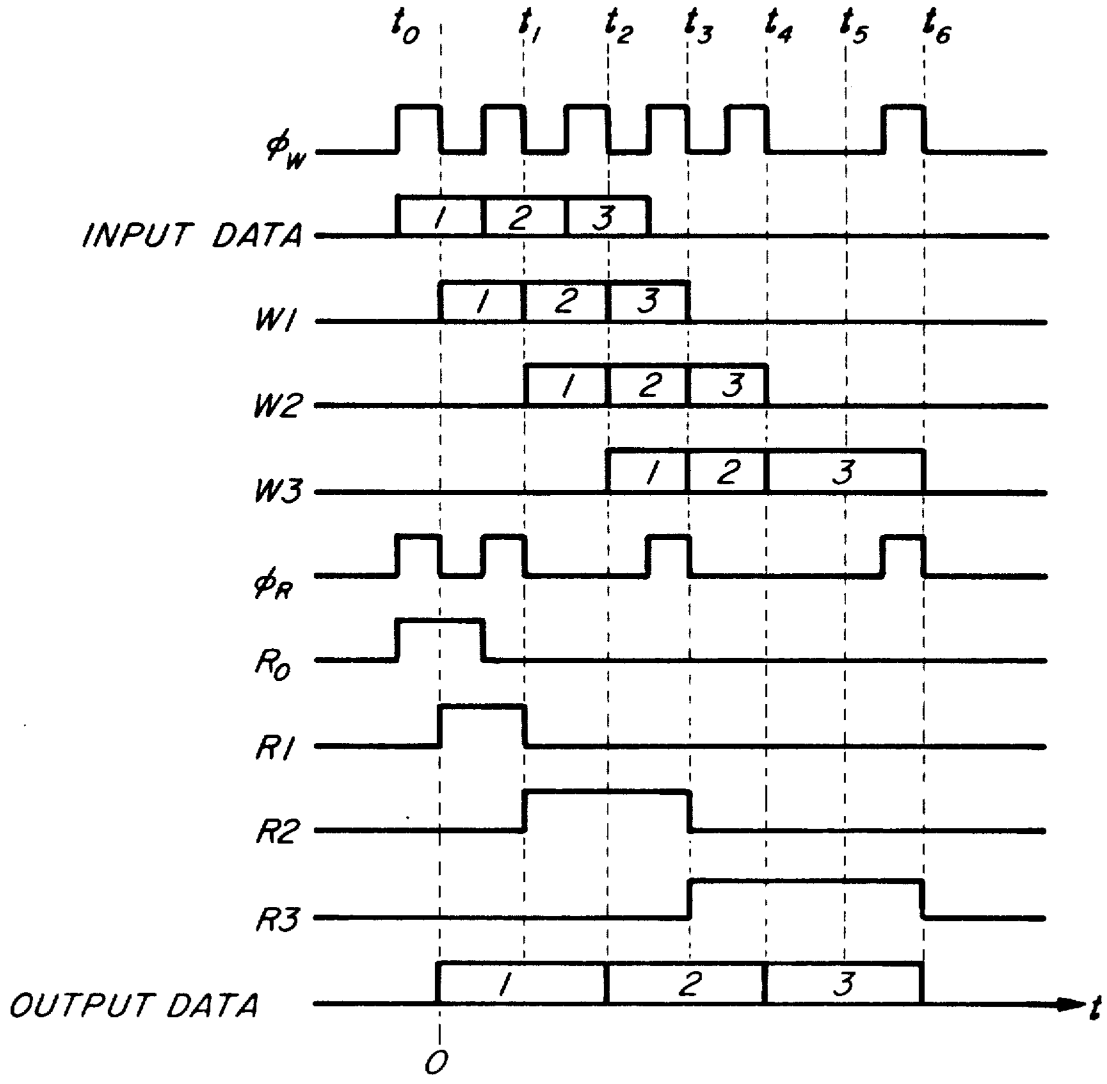
FIG. 6 is a timing diagram of the register of FIG. 4 using the circuitry of FIG. 5 with the output data being half the rate of the input data.

FIG. 6 shows a timing diagram for the case in which it is desired to have the output data appear immediately at half the rate of the input data. As is shown in the Figure, a marker pulse $R_o$ is introduced into the read shift register concurrently with the first (1) data input pulse. The clock pulse going from the high state to the low state at time $t_0$ shifts the (1) input data pulse into the first stages. The signal level at $W_1$ is equal to the level of the (1) input data pulse. The readout clock $\phi_R$ concurrently goes from high to low and shifts the marker pulse $R_o$ into the first read register stage such that the signal at $R_1$ goes positive turning on transistor 28 of read gate 1. Transistor 28 thereby provides a low-impedance path between terminal 128 and the output data line 22 and the input pulse is thus immediately (at time $t_0$) available on the output line. The second transition at time $t_1$ of $\phi_W$ from high to low causes the second (2) input data pulse to be stored in the first stage of the write register and the first (1) input data pulse to be stored in the second stage of the write register.

In order to have the readout rate of the output data equal to one-half the rate of the input data, the first pulse must be propagated on the output line for two periods of the write clock $\phi_W$ The transition of $\phi_R$ from high to low at time $t_1$ shifts the scanning pulse into the second read register stage and R2 goes "high". The read gate of the second register stage is thus enabled and since the first (1) input data pulse is in the second stage of the write register, it continues to appear on the output line.

The third transition of $\phi_W$ from high to low occurring at time $t_2$ shifts the third (3) input data pulse into the first stage of the write register, the second (2) data pulse into the second stage of the write register and the first (1) data pulse into the third stage of the write register. Not applying any clock pulses to the read register keeps it in its previous state which maintains the read gate of the second stage energized. However, since the second (2) input data pulse has been shifted to the second stage of the write register, the second (2) data pulse is now coupled to the output data line.

The fourth transition of $\phi_W$ from high to low occurring at time $t_3$ causes the data in the write register to be shifted one stage down. Thus, the information in stage 2 is now the third (3) input data pulse and information in stage 3 is the second (2) input data pulse while the first stage if there are no more input pulses is empty. The second (2) input data pulse must still be readout for a length of time equal to the period of $\phi_W$ A clock pulse $\phi_R$ is provided at time $t_3$ such that the read register shifts the scanning pulse from the second stage to the third stage of the read register. Since the output (R3) of the third stage of the read register is high and since the second (2) input data pulse is present in the third stage of the write register, the second input data pulse is coupled to the output line until time $t_4$.

The fifth transition of $\phi_W$ from high to low at time $t_4$ shifts the (3) input data pulse into the third stage of the write register. Note that the read gate of the third read register is enabled and will remain in that stage until the next $\phi_R$ clock pulse makes a transition from high to low. Allowing the input data pulse to dwell in the third register stage for an amount of time equal to two periods of $\phi_W$ provides the desired readout. The transition of the read clock pulse at time $t_6$ cuts off the read gate associated with the third stage, and the coupling of the third input data pulse to the output line is terminated. Alternatively, the clock pulse $\phi_W$ could be used to down shift the output information contained in the third stage of the write register terminating the propagation of the third input data pulse on the output line after two periods on the $\phi_W$ clock.

It has thus been shown that by means of two shifts registers and associated read gates to couple the two registers that pulses of one rate may be received and stored and that they may be read out immediately and at a second rate in the order received.

What is claimed is:

1. A circuit for receiving successive data bits of an input bit stream, said bits occurring at a first rate, and for reading the bits out at a second rate not greater than said first rate comprising, in combination:

storage means having at least N storage locations, where N is at least equal to the number of bits in the stream;

means responsive to the successive bits for storing them in different locations in said storage means;

N output gates, each connected to a different storage means location; and means for energizing said output gates, one at a time, at a rate not greater than said first rate in the same order in which the bits are stored in the corresponding storage means locations, and starting at a time during which the bits are being stored, for reading-out the stored bits at said second rate in the same order in which they are received.

2. The combination as claimed in claim 1:

wherein said storage means and said means responsive to the successive bits together comprise a first shift register, means for applying said bits at said first rate to the first stage of the register, and means for shifting the bits at said first rate from stage-to-stage to load the register;

wherein said second rate is synchronous with and a fraction of said first rate; and wherein said means for energizing said output gates comprises an N stage second shift register, each of whose stages is coupled to a different one of said output gates, said second shift register being operated at a rate to produce, by selectively energizing said output gates, a readout of said data bits at said second rate during the time said bits are shifted from stage-to-stage.

3. The combination as claimed in claim 2:

further including a common output line; and wherein each of said N output gates is connected to said common line for producing thereon the readout of said data bits stored in said first register.

4. The combination as claimed in claim 3:

wherein each of said N output gates comprises a single transistor operated as a transmission gate, said transistor having a control electrode and a conduction path whose conductivity is determined by the potential applied to said electrode;

wherein the conduction path of each transistor is connected at one end to a different one of the stages of said shift register and at the other end to said common line; and wherein the control electrode of each transistor is connected to a different one of the stages of said second shift register.

5. The combination as claimed in claim 4:

wherein each of said transistors comprises a metal-oxide insulated-gate field-effect transistor; and wherein said first and second registers comprise solely insulated-gate field-effect transistors.

6. The combination as claimed in claim 1:

wherein said storage means comprises N flip-flops for storing said input bits, one flip-flop per storage location, wherein said means responsive to the successive bits includes a first shift register having N stages and N write-in gates, each gate being coupled to a different one of said register stages and each connected to a different one of said flip-flops; and wherein said means for energizing said output gate comprises a second shift register having N stages.

7. The combination as claimed in claim 6:

further providing a common input line for carrying said input data bits connected to said write-in gates; and wherein said means responsive to successive bits includes clocking means coupled to said first register for operating said first register at said first rate for sequentially energizing said write-in gates one at a time, for causing successive bits in said data bit stream to be stored in successive stages of said flip-flops.

8. The combination as claimed in claim 7:

further providing a common output line connected to said output gates; and wherein said means for energizing said output gates includes clocking means coupled to said second register for operating said second register at said second rate for sequentially energizing said output gates for causing the successive bits of data stored in said flip-flops to be read out on said output line at said second rate.

9. The combination as claimed in claim 8:

wherein said clocking means for operating said first and second registers includes means for operating said registers at first and second independent and unrelated rates.

10. The combination as claimed in claim 8:

wherein said clocking means for operating said first and second registers includes means for operating said second register at said second rate which is at most equal to said first rate.

11. A buffer register for receiving data at a first rate and reading-out the data at a second rate, comprising:

an input line for carrying serially propagated input data pulses occurring at said first rate;

an output line;

N data storing elements for storing said input pulses in the order received, where N is an integer greater than one;

first means operated at said first rate for serially coupling one of said storing elements at a time to said input line for storing, in each one of said elements, a different one of said input data pulses; and second means for serially coupling said storing elements one at a time to said output line, including means for operating said second means at said second rate and concurrently with the storing of said input data pulses, for propagating serially on said output line the data pulses stored in said elements.

12. The combination as claimed in claim 11:

wherein said first means includes a write shift register having a N stages and a corresponding number of write gates, each one of said gates being connected between a different one of said data storing elements and said input line; and wherein said second means including a read shift register having N stages and a corresponding number of read gates, each one of said read gates being connected between a different one of said data storing elements and said output lines.

13. The combination as claimed in claim 12:

wherein each of said data storing element comprises a static flip-flop and wherein each of said buffer register stages comprises solely metal-oxide semiconductor devices.

* * * * *

UNITED STATES PATENT OFFICE
CERTIFICATE OF CORRECTION

Patent No. 3,623,020 Dated November 23, 1971

Inventor(s) Roger A. Mao

It is certified that error appears in the above-identified patent and that said Letters Patent are hereby corrected as shown below:

Column 2 line 36 before "w" insert --- Ø ---.

Column 8 line 40 delete "a" (first occurrence).

line 44 change "including" to ---includes---.

line 50 delete "comprises" and substitute therefor ---is---.

Signed and sealed this 6th day of February 1973.

(SEAL)
Attest:

EDWARD M.FLETCHER,JR.
Attesting Officer

ROBERT GOTTSCHALK
Commissioner of Patents